United States Patent
Umemura

(10) Patent No.: US 11,747,940 B2
(45) Date of Patent: Sep. 5, 2023

(54) CALCULATION DEVICE, INPUT DEVICE, CALCULATION METHOD, AND PROGRAM

(71) Applicant: Alps Alpine Co., Ltd., Tokyo (JP)

(72) Inventor: Shunsuke Umemura, Miyagi-ken (JP)

(73) Assignee: Alps Alpine Co., Ltd.

( * ) Notice: Subject to any disclaimer, the term of this patent is extended or adjusted under 35 U.S.C. 154(b) by 56 days.

(21) Appl. No.: 17/570,415

(22) Filed: Jan. 7, 2022

(65) Prior Publication Data

US 2022/0129105 A1 Apr. 28, 2022

Related U.S. Application Data

(63) Continuation of application No. PCT/JP2020/011128, filed on Mar. 13, 2020.

(30) Foreign Application Priority Data

Aug. 5, 2019 (JP) .................. 2019-143990

(51) Int. Cl.
  *G06F 3/041* (2006.01)
  *G06F 3/044* (2006.01)
  *G06F 3/042* (2006.01)

(52) U.S. Cl.
  CPC .......... *G06F 3/0418* (2013.01); *G06F 3/0416* (2013.01); *G06F 3/0446* (2019.05); *G06F 3/04186* (2019.05); *G06F 3/042* (2013.01)

(58) Field of Classification Search
  CPC .. G06F 3/0418; G06F 3/0416; G06F 3/04186; G06F 3/0446
  See application file for complete search history.

(56) References Cited

U.S. PATENT DOCUMENTS

| 9,798,397 B2 | 10/2017 | Oonishi et al. |
| 10,908,737 B2 | 2/2021 | Sagawai |

(Continued)

FOREIGN PATENT DOCUMENTS

| JP | 2008-134836 A | 6/2008 |
| JP | 2016-224834 A | 12/2016 |

(Continued)

OTHER PUBLICATIONS

International Search Report (English translation) for corresponding International Application No. PCT/JP2020/011128 dated Jun. 16, 2020 (2 Pages).

*Primary Examiner* — Darlene M Ritchie
(74) *Attorney, Agent, or Firm* — Harness, Dickey & Pierce, P.L.C.

(57) ABSTRACT

A calculation device includes a detection value acquisition unit configured to acquire the capacitance detection values output from first sensing electrodes and second sensing electrodes, a first capacitance value calculation unit configured to calculate, on the basis of the capacitance detection values acquired by the detection value acquisition unit and coefficients each preset for one of the first sensing electrodes and the second sensing electrodes, the first capacitance calculation values each for one of sensing surfaces of the first sensing electrodes and the second sensing electrodes, and an image data calculation unit configured to calculate the image data on the basis of the plurality of the first capacitance calculation values calculated by the first capacitance value calculation unit.

17 Claims, 10 Drawing Sheets

(56) References Cited

U.S. PATENT DOCUMENTS

| | | | | |
|---|---|---|---|---|
| 2008/0158175 A1* | 7/2008 | Hotelling | .............. | G06F 3/0418 |
| | | | | 345/173 |
| 2009/0128511 A1* | 5/2009 | Sinclair | ................ | G06F 3/0202 |
| | | | | 345/174 |
| 2012/0050211 A1* | 3/2012 | King | ................ | G06F 3/041662 |
| | | | | 345/174 |
| 2013/0257799 A1* | 10/2013 | Lamont | ................ | G06F 3/0446 |
| | | | | 345/174 |
| 2015/0115977 A1* | 4/2015 | Bohannon | ............ | G06F 3/0446 |
| | | | | 324/601 |
| 2017/0322649 A1* | 11/2017 | Wang | .................... | G06F 3/0443 |
| 2019/0057669 A1* | 2/2019 | Nakanishi | ............... | G06F 3/047 |

FOREIGN PATENT DOCUMENTS

| | | |
|---|---|---|
| JP | 2019-095841 A | 6/2019 |
| WO | 2014/174771 A1 | 10/2014 |
| WO | 2018/180280 A1 | 10/2018 |

* cited by examiner

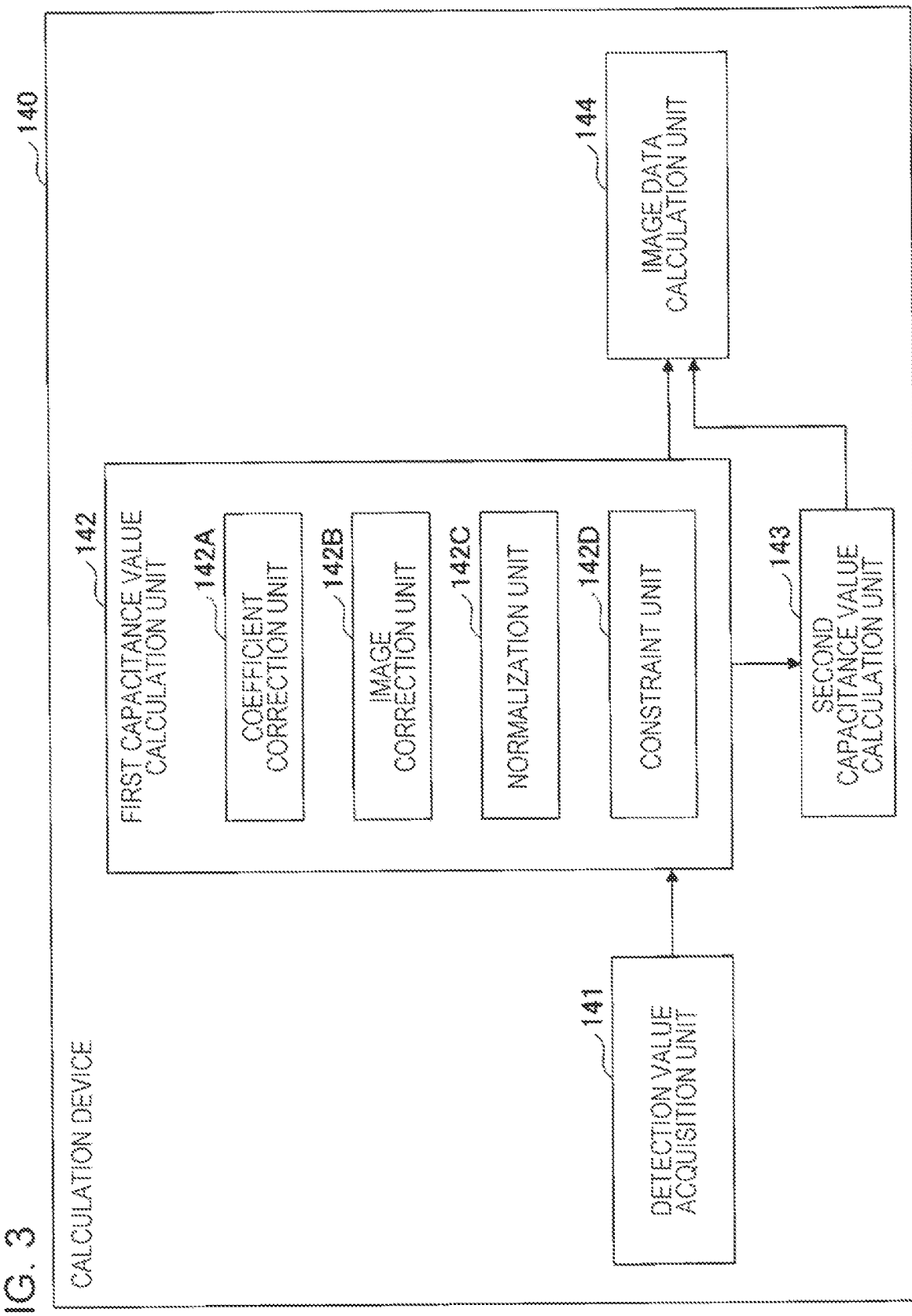

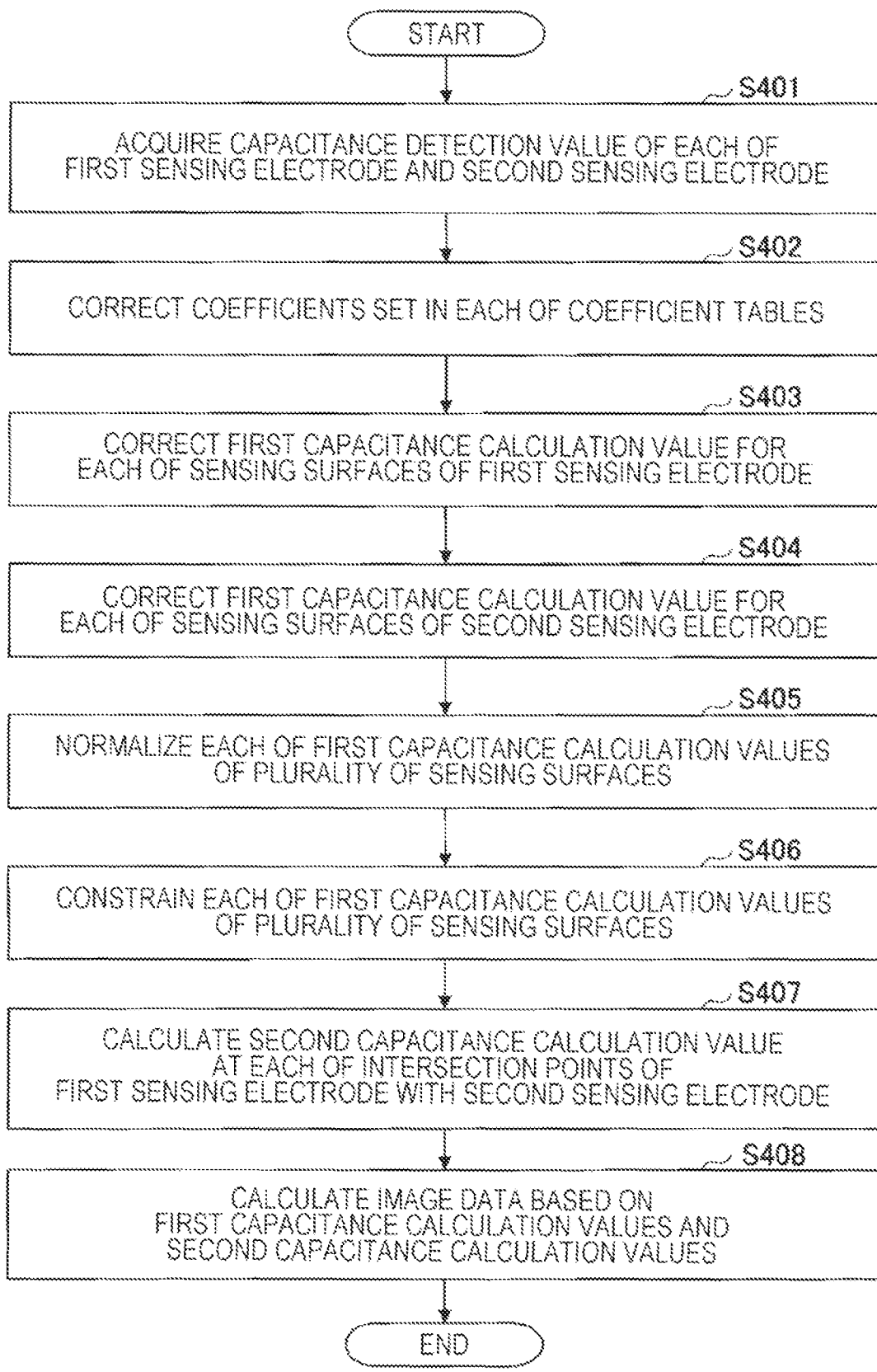

|    | #1 | #2  | #3  | #4  | #5  | #6 |
|----|----|-----|-----|-----|-----|----|
| Ya | 1  | 0.8 | 0.6 | 0.4 | 0.2 | 0  |
| Yb | 1  | 0.8 | 0.6 | 0.4 | 0.2 | 0  |
| Yc | 1  | 0.8 | 0.6 | 0.4 | 0.2 | 0  |
| Yd | 1  | 0.8 | 0.6 | 0.4 | 0.2 | 0  |

|    | #1 | #2  | #3  | #4  | #5  | #6 |
|----|----|-----|-----|-----|-----|----|
| Ya | 0  | 0.2 | 0.4 | 0.6 | 0.8 | 1  |
| Yb | 0  | 0.2 | 0.4 | 0.6 | 0.8 | 1  |
| Yc | 0  | 0.2 | 0.4 | 0.6 | 0.8 | 1  |
| Yd | 0  | 0.2 | 0.4 | 0.6 | 0.8 | 1  |

|    | Xa   | Xb   | Xc   | Xd   | Xe   |
|----|------|------|------|------|------|
| #1 | 1    | 1    | 1    | 1    | 1    |
| #2 | 0.75 | 0.75 | 0.75 | 0.75 | 0.75 |
| #3 | 0.5  | 0.5  | 0.5  | 0.5  | 0.5  |
| #4 | 0.25 | 0.25 | 0.25 | 0.25 | 0.25 |
| #5 | 0    | 0    | 0    | 0    | 0    |

|    | Xa   | Xb   | Xc   | Xd   | Xe   |
|----|------|------|------|------|------|
| #1 | 0    | 0    | 0    | 0    | 0    |
| #2 | 0.25 | 0.25 | 0.25 | 0.25 | 0.25 |
| #3 | 0.5  | 0.5  | 0.5  | 0.5  | 0.5  |
| #4 | 0.75 | 0.75 | 0.75 | 0.75 | 0.75 |
| #5 | 1    | 1    | 1    | 1    | 1    |

FIG. 6A (1a) TRANSVERSE AND LEFT COEFFICIENT TABLE (BEFORE CORRECTION) 501

|     | #1 | #2  | #3  | #4  | #5  | #6 |
|-----|----|-----|-----|-----|-----|----|
| Ya  | 1  | 0.8 | 0.6 | 0.4 | 0.2 | 0  |
| Yb  | 1  | 0.8 | 0.6 | 0.4 | 0.2 | 0  |
| Yc  | 1  | 0.8 | 0.6 | 0.4 | 0.2 | 0  |
| Yd  | 1  | 0.8 | 0.6 | 0.4 | 0.2 | 0  |

FIG. 6B (1b) IMAGE (BEFORE CORRECTION)

|     | #1 | #2 | #3 | #4 | #5 | #6 |
|-----|----|----|----|----|----|----|
| Ya  | 1  | 1  | 1  | 1  | 1  | 1  |
| Yb  | 2  | 2  | 2  | 2  | 2  | 2  |
| Yc  | 1  | 1  | 1  | 1  | 1  | 1  |
| Yd  | 2  | 2  | 2  | 2  | 2  | 2  |

FIG. 6C (1c) CALCULATION VALUE ((1a)×(1b))

|     | #1 | #2  | #3  | #4  | #5  | #6 |
|-----|----|-----|-----|-----|-----|----|
| Ya  | 1  | 0.8 | 0.6 | 0.4 | 0.2 | 0  |
| Yb  | 2  | 1.6 | 1.2 | 0.8 | 0.4 | 0  |
| Yc  | 1  | 0.8 | 0.6 | 0.4 | 0.2 | 0  |
| Yd  | 2  | 1.6 | 1.2 | 0.8 | 0.4 | 0  |

FIG. 6D (1d) LEFT DETECTION VALUE (PREDICTION VALUE)

|     | PREDICTION VALUE |
|-----|------------------|
| Ya  | 3                |
| Yb  | 6                |
| Yc  | 3                |
| Yd  | 6                |

FIG. 6E (1e) LEFT DETECTION VALUE (ACTUAL MEASUREMENT VALUE)

|     | ACTUAL MEASUREMENT VALUE |
|-----|--------------------------|
| Ya  | 0                        |
| Yb  | 6                        |
| Yc  | 4.5                      |
| Yd  | 3                        |

FIG. 6F (1f) CORRECTION VALUE ((1d)÷(1e))

|     | CORRECTION VALUE |
|-----|------------------|
| Ya  | ∞                |
| Yb  | 1                |
| Yc  | 0.67             |
| Yd  | 2                |

FIG. 6G (1g) TRANSVERSE AND LEFT COEFFICIENT TABLE (AFTER CORRECTION) ((1f)÷(1a)) 501'

|     | #1   | #2   | #3   | #4   | #5   | #6 |
|-----|------|------|------|------|------|----|
| Ya  | ∞    | ∞    | ∞    | ∞    | ∞    | ∞  |
| Yb  | 1    | 1.25 | 1.67 | 2.5  | 5    | ∞  |
| Yc  | 0.67 | 0.83 | 1.11 | 1.67 | 3.33 | ∞  |
| Yd  | 2    | 2.5  | 3.33 | 5    | 10   | ∞  |

FIG. 6H (1h) IMAGE (AFTER CORRECTION) ((1b)÷(1g))

|     | #1  | #2  | #3  | #4  | #5  | #6 |
|-----|-----|-----|-----|-----|-----|----|
| Ya  | 0   | 0   | 0   | 0   | 0   | 0  |
| Yb  | 2   | 1.6 | 1.2 | 0.8 | 0.4 | 0  |
| Yc  | 1.5 | 1.2 | 0.9 | 0.6 | 0.3 | 0  |
| Yd  | 1   | 0.8 | 0.6 | 0.4 | 0.2 | 0  |

FIG. 7A (2a) TRANSVERSE AND RIGHT COEFFICIENT TABLE (BEFORE CORRECTION) — 502

|    | #1 | #2  | #3  | #4  | #5  | #6 |
|----|----|-----|-----|-----|-----|----|
| Ya | 0  | 0.2 | 0.4 | 0.6 | 0.8 | 1  |
| Yb | 0  | 0.2 | 0.4 | 0.6 | 0.8 | 1  |
| Yc | 0  | 0.2 | 0.4 | 0.6 | 0.8 | 1  |
| Yd | 0  | 0.2 | 0.4 | 0.6 | 0.8 | 1  |

FIG. 7B (2b) IMAGE (BEFORE CORRECTION)

|    | #1 | #2 | #3 | #4 | #5 | #6 |
|----|----|----|----|----|----|----|
| Ya | 1  | 1  | 1  | 1  | 1  | 1  |
| Yb | 2  | 2  | 2  | 2  | 2  | 2  |
| Yc | 1  | 1  | 1  | 1  | 1  | 1  |
| Yd | 2  | 2  | 2  | 2  | 2  | 2  |

FIG. 7C (2c) CALCULATION VALUE (2a)×(2b)

|    | #1 | #2  | #3  | #4  | #5  | #6 |
|----|----|-----|-----|-----|-----|----|
| Ya | 0  | 0.2 | 0.4 | 0.6 | 0.8 | 1  |
| Yb | 0  | 0.4 | 0.8 | 1.2 | 1.6 | 2  |
| Yc | 0  | 0.2 | 0.4 | 0.6 | 0.8 | 1  |
| Yd | 0  | 0.4 | 0.8 | 1.2 | 1.6 | 2  |

FIG. 7D (2d) RIGHT DETECTION VALUE (PREDICTION VALUE)

|    | PREDICTION VALUE |
|----|------------------|
| Ya | 3                |
| Yb | 6                |
| Yc | 3                |
| Yd | 6                |

FIG. 7E (2e) RIGHT DETECTION VALUE (ACTUAL MEASUREMENT VALUE)

|    | ACTUAL MEASUREMENT VALUE |
|----|--------------------------|
| Ya | 0                        |
| Yb | 3                        |
| Yc | 4.5                      |
| Yd | 2                        |

FIG. 7F (2f) CORRECTION VALUE (2d)÷(2e)

|    | CORRECTION VALUE |
|----|------------------|
| Ya | $\infty$         |
| Yb | 2                |
| Yc | 0.67             |
| Yd | 3                |

FIG. 7G (2g) TRANSVERSE AND RIGHT COEFFICIENT TABLE (AFTER CORRECTION) ((2f)÷(2a)) — 502'

|    | #1       | #2       | #3       | #4       | #5       | #6       |
|----|----------|----------|----------|----------|----------|----------|
| Ya | $\infty$ | $\infty$ | $\infty$ | $\infty$ | $\infty$ | $\infty$ |
| Yb | $\infty$ | 10       | 5        | 3.33     | 2.5      | 1        |
| Yc | $\infty$ | 3.33     | 1.67     | 1.11     | 0.83     | 0.67     |
| Yd | $\infty$ | 15       | 7.5      | 5        | 3.75     | 3        |

FIG. 7H (2h) IMAGE (AFTER CORRECTION) ((2b)÷(2g))

|    | #1 | #2   | #3   | #4  | #5   | #6   |
|----|----|------|------|-----|------|------|
| Ya | 0  | 0    | 0    | 0   | 0    | 0    |
| Yb | 0  | 0.2  | 0.4  | 0.6 | 0.8  | 1    |
| Yc | 0  | 0.3  | 0.6  | 0.9 | 1.2  | 1.5  |
| Yd | 0  | 0.13 | 0.26 | 0.4 | 0.53 | 0.67 |

FIG. 7I (2i) IMAGE (RIGHT AND LEFT SUM) ((1h)+(2h))

|    | #1  | #2   | #3   | #4  | #5   | #6   |
|----|-----|------|------|-----|------|------|
| Ya | 0   | 0    | 0    | 0   | 0    | 0    |
| Yb | 2   | 1.8  | 1.6  | 1.4 | 1.2  | 1    |
| Yc | 1.5 | 1.5  | 1.5  | 1.5 | 1.5  | 1.5  |
| Yd | 1   | 0.93 | 0.86 | 0.8 | 0.73 | 0.67 |

CALCULATION DEVICE, INPUT DEVICE, CALCULATION METHOD, AND PROGRAM

CLAIM OF PRIORITY

This application is a Continuation of International Application No. PCT/JP2020/011128 filed on Mar. 13, 2020, which claims benefit of Japanese Patent Application No. 2019-143990 filed on Aug. 5, 2019. The entire contents of each application noted above are hereby incorporated by reference.

BACKGROUND OF THE INVENTION

1. Field of the Invention

The present invention relates to a calculation device, an input device, a calculation method, and a program.

2. Description of the Related Art

Hitherto, a technology has been used that detects the proximity of an operating body to the operating surface of an input device using a capacitance sensor having mutually perpendicular longitudinal electrodes and transverse electrodes and generates image data representing the proximity (refer to, for example, International publication No. 2018/012030).

SUMMARY OF THE INVENTION

A sensing electrode with a plurality of sensing surfaces arranged in a straight line has hitherto been used. In a capacitance sensor using such sensing electrodes, a mid portion between two adjacent sensing surfaces of a longitudinal electrode needs to intersect with a mid portion between two adjacent sensing surfaces of a transverse electrode.

However, according to an existing technology, the intersection point of the longitudinal and transverse electrodes (i.e., the mid portion of each sensing electrode) is used as the detection point, but in reality, a point on each sensing electrode at which the detection sensitivity is higher is a point on the sensing surface of the electrode, which has a larger area. For this reason, the accuracy of detection of a proximity position obtained by calculation may decrease.

According to an embodiment, a calculation device is provided that calculates image data representing proximity of an operating body to an operating surface on a basis of capacitance detection values detected by a capacitance sensor. The capacitance sensor includes a plurality of first sensing electrodes and a plurality of the second sensing electrodes disposed perpendicularly to each other, and each of the first sensing electrodes and the second sensing electrodes has a plurality of sensing surfaces. The capacitance detection values are output from the plurality of first sensing electrodes and the plurality of the second sensing electrodes. The calculation device includes a detection value acquisition unit configured to acquire the capacitance detection values output from the first sensing electrodes and the second sensing electrodes, a first capacitance value calculation unit configured to calculate, on a basis of the capacitance detection values acquired by the detection value acquisition unit and coefficients each preset for one of the first sensing electrodes and the second sensing electrodes, the first capacitance calculation values each for one of sensing surfaces of the first sensing electrodes and the second sensing electrodes, and an image data calculation unit configured to calculate the image data on a basis of the plurality of the first capacitance calculation values calculated by the first capacitance value calculation unit.

BRIEF DESCRIPTION OF THE DRAWINGS

FIG. 3 is a block diagram of the functional configuration of a calculation device according to an embodiment;

FIG. 4 is a flowchart illustrating the procedure for the processing performed by a calculation device according to an embodiment;

FIGS. 5A to 5D illustrates an example of coefficient tables used by the calculation device according to an embodiment;

FIGS. 6A to 6H illustrate an example of the processing performed by a coefficient correction unit and an image correction unit according to an embodiment;

FIGS. 7A to 7I illustrate an example of the processing performed by a coefficient correction unit and an image correction unit according to an embodiment;

DESCRIPTION OF THE PREFERRED EMBODIMENTS

An embodiment is described below with reference to the accompanying drawings.

Configuration of Capacitance Sensor 100

Figure 1:
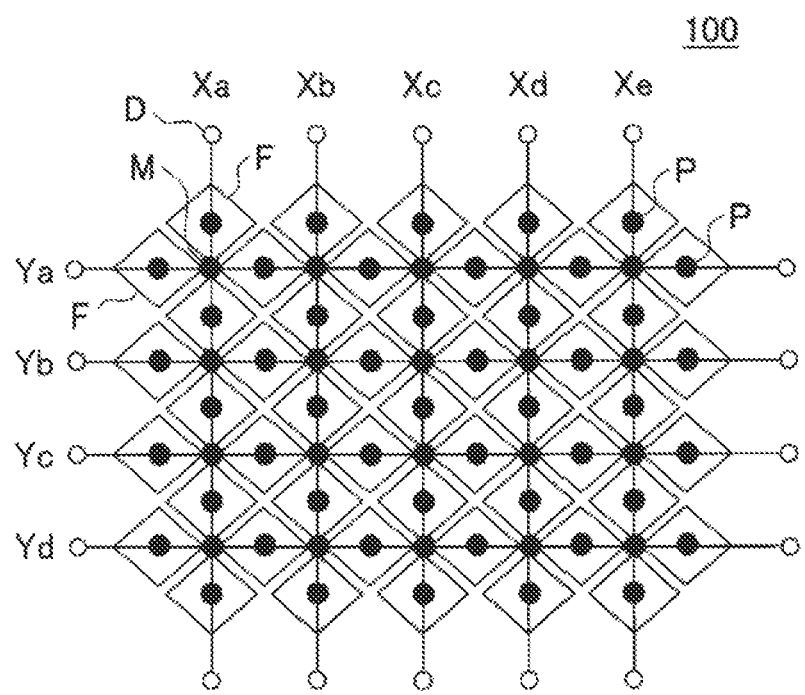
FIG. 1 illustrates the configuration of a capacitance sensor according to an embodiment.

FIG. 1 illustrates the configuration of a capacitance sensor 100 according to an embodiment. As illustrated in FIG. 1, a capacitance sensor 100 has a plurality (five in the example illustrated in FIG. 1) of first sensing electrodes Xa to Xe and a plurality (four in the example illustrated in FIG. 1) of second sensing electrodes Ya to Yd, each of which is arranged so as to be perpendicular to the first sensing electrodes Xa to Xe.

The first sensing electrodes Xa to Xe all extend in the longitudinal direction. The first sensing electrodes Xa to Xe are arranged in parallel to one another with a certain spacing therebetween in the transverse direction. Each of the first sensing electrodes Xa to Xe has a plurality (five in the example illustrated in FIG. 1) of diamond-shaped sensing surfaces F that are connected in the longitudinal direction. That is, in the example illustrated in FIG. 1, the capacitance sensor 100 has 25 sensing surfaces F arranged in a 5 rows×5 columns matrix due to the five first sensing electrodes Xa to Xe. Each of the first sensing electrodes Xa to Xe has a detection portion D at each of the upper and lower ends to detect the capacitance value. Each of the first sensing electrodes Xa to Xe is formed by using a metal film (e.g., a copper film), ITO (Indium Tin Oxide), or another conductive material.

The second sensing electrodes Ya to Yd are all sensing electrodes that extend in the transverse direction. The second sensing electrodes Ya to Yd are arranged in parallel with one another with a certain spacing therebetween in the longitudinal direction. Each of the second sensing electrodes Ya to Yd has a plurality (six in the example illustrated in FIG. 1)

of diamond-shaped sensing surfaces F connected in the transverse direction. That is, in the example illustrated in FIG. 1, the capacitance sensor 100 has 24 sensing surfaces F arranged in a 4 rows×6 columns matrix due to the four second sensing electrodes Ya to Yd. Each of the second sensing electrodes Ya to Yd has a detection portion D at each of the left end and right end to detect the capacitance value. Each of the second sensing electrodes Ya to Yd is formed by using a metal film (e.g., copper film), ITO, or another conductive material.

As illustrated in FIG. 1, each of the first sensing electrodes Xa to Xe intersects with each of the second sensing electrodes Ya to Yd at intersection points M, each of which is the midpoint between two adjacent sensing surfaces F. Similarly, each of the second sensing electrodes Ya to Yd intersects with each of the first sensing electrodes Xa to Xe at intersection points M, each of which is the midpoint of two adjacent sensing surfaces F. That is, in the example illustrated in FIG. 1, the capacitance sensor 100 has 20 intersection points M formed therein in a 4 rows×5 columns matrix by the first sensing electrodes Xa to Xe and the second sensing electrodes Ya to Yd.

Device Configuration of Input Device 10

Figure 2:
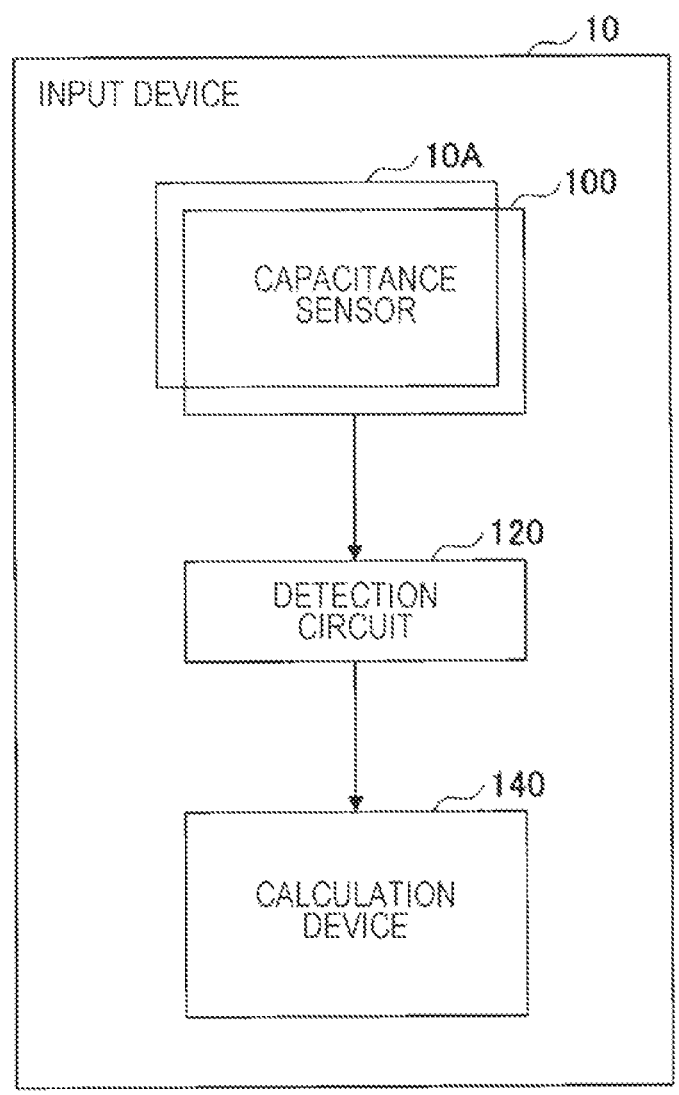
FIG. 2 is a block diagram of the device configuration of an input device according to an embodiment.

FIG. 2 is a block diagram of the device configuration of the input device 10 according to an embodiment. The input device 10 illustrated in FIG. 2 is a device capable of detecting the proximity state (the position, range, and distance) of an operating body relative to the operating surface 10A and generating and outputting image data representing the detected proximity state.

As illustrated in FIG. 2, the input device 10 includes the capacitance sensor 100 (refer to FIG. 1), a detection circuit 120, and a calculation device 140.

The capacitance sensor 100 is provided on top of the operating surface 10A. In the capacitance sensor 100, the capacitance value of each of the first sensing electrodes Xa to Xe and the second sensing electrodes Ya to Yd varies in accordance with the proximity state of the operating body relative to the operating surface 10A.

The detection circuit 120 detects the capacitance values of the detection portions D at the upper and lower ends of each of the first sensing electrodes Xa to Xe. Since each of the first sensing electrodes Xa to Xe has a resistance, the capacitance value detected by the detection portion D at the upper end differs from the capacitance value detected by the detection portion D at the lower end in accordance with the proximity position of the operating body in each of the first sensing electrodes Xa to Xe.

In addition, the detection circuit 120 detects the capacitance values of the detection portions D at the left and right ends of each of the second sensing electrodes Ya to Yd. Since each of the second sensing electrodes Ya to Yd has a resistance, the capacitance value detected by the detection portion D at the left end differs from the capacitance value detected by the detection portion D at the right end in accordance with the proximity position of the operating body in each of the second sensing electrodes Ya to Yd.

The calculation device 140 calculates the image data representing the proximity of the operating body to the operating surface 10A of the input device 10 on the basis of the capacitance values detected by the detection circuit 120. The calculation device 140 is implemented by, for example, an IC (Integrated Circuit).

Herein, the calculation device 140 according to the present embodiment can calculate the capacitance value (hereinafter referred to as a "first capacitance calculation value") at the detection point P (refer to FIG. 1) of each of the plurality of sensing surfaces F provided in the capacitance sensor 100. In addition, the calculation device 140 according to the present embodiment can calculate the capacitance value (hereinafter referred to as a "second capacitance calculation value") at each of the plurality of intersection points M (refer to FIG. 1) on the capacitance sensor 100 (refer to FIG. 1). Then, the calculation device 140 according to the present embodiment can calculate high-resolution image data with higher detection accuracy of the proximity state on the basis of the first capacitance calculation values at the plurality of detection points P and the second capacitance calculation values at a plurality of intersection points M.

Functional Configuration of Calculation Device 140

FIG. 3 is a block diagram illustrating the functional configuration of the calculation device 140 according to an embodiment. As illustrated in FIG. 3, the calculation device 140 includes a detection value acquisition unit 141, a first capacitance value calculation unit 142, a second capacitance value calculation unit 143, and an image data calculation unit 144.

The detection value acquisition unit 141 acquires, from the detection circuit 120, the capacitance detection values of the first sensing electrodes Xa to Xe and the second sensing electrodes Ya to Yd. At this time, the detection value acquisition unit 141 acquires the capacitance detection value detected by the detection portion D (an example of a "first detection portion") at the upper end (an example of "one end of a first sensing electrode") and the capacitance detection value detected by the detection portion D (an example of a "second detection portion") at the lower end (an example of "the other end of a first sensing electrode") from each of the first sensing electrodes Xa to Xe. In addition, the detection value acquisition unit 141 acquires the capacitance detection values detected by the detection portion D (an example of a "third detection portion") at the left end (an example of "one end of a second sensing electrode") and the capacitance detection value detected by the detection portion D (an example of a "fourth detection portion") at the right end (an example of "the other end of a second sensing electrode") from each of the second sensing electrodes Ya to Yd.

The first capacitance value calculation unit 142 calculates the first capacitance calculation value for each of the sensing surfaces F of the first sensing electrodes Xa to Xe and the second sensing electrodes Ya to Yd on the basis of the plurality of capacitance detection values acquired by the detection value acquisition unit 141 and coefficients preset for the sensing surfaces F of the first sensing electrodes Xa to Xe and the second sensing electrodes Ya to Yd. The coefficients are set in coefficient tables 501 to 504 (refer to FIGS. 5A to 5D).

More specifically, the first capacitance value calculation unit 142 includes a coefficient correction unit 142A, an image correction unit 142B, a normalization unit 142C, and a constraint unit 142D.

The coefficient correction unit 142A corrects the coefficients set in each of the coefficient tables 501 to 504 on the basis of the plurality of capacitance detection values acquired by the detection value acquisition unit 141. A correction method for use of the coefficient correction unit 142A is described below with reference to FIGS. 6A to 6H and FIGS. 7A to 7I.

The image correction unit 142B corrects the first capacitance calculation value of each of the sensing surfaces F included in an image of the first sensing electrodes Xa to Xe and the first capacitance calculation value of each of the sensing surfaces F included in an image of the second sensing electrodes Ya to Yd on the basis of the coefficient tables 501 to 504 corrected by the coefficient correction unit 142A. The term "image of the first sensing electrodes Xa to Xe" refers to the first capacitance calculation values of the sensing surfaces F of the first sensing electrodes Xa to Xe, which values are obtained on the basis of the capacitance detection values of the first sensing electrodes Xa to Xe acquired by the detection value acquisition unit 141. In addition, the term "image of the second sensing electrodes Ya to Yd" refers to the first capacitance calculation values of the sensing surfaces F of the second sensing electrodes Ya to Yd, which values are obtained on the basis of the capacitance detection values of the second sensing electrodes Ya to Yd acquired by the detection value acquisition unit 141.

Note that the image correction unit 142B may use, as the "image of the first sensing electrodes Xa to Xe" and the "image of the second sensing electrodes Ya to Yd", any non-zero values set as the initial values of the first capacitance calculation values of the sensing surfaces F. In addition, in the second and subsequent calculations, the image correction unit 142B may use, as the "image of the first sensing electrodes Xa to Xe" and the "image of the second sensing electrodes Ya to Yd", the values corrected in the immediately previous calculation and set as the initial values of the first capacitance calculation values of the sensing surfaces F. In this case, the calculation device 140 may be able to increase the speed of the calculation.

More specifically, the image correction unit 142B calculates, for each of the second sensing electrodes Ya to Yd, a first intermediate calculation value of the capacitance value of each of the sensing surfaces F included in the image of the current second sensing electrodes Ya to Yd by dividing the first capacitance calculation value of the sensing surface F by the coefficient (the coefficient corrected by the coefficient correction unit 142A) that is set in the transverse and left coefficient table 501 and that corresponds to the sensing surface F.

Subsequently, the image correction unit 142B calculates, for each of the second sensing electrodes Ya to Yd, a second intermediate calculation value of the capacitance value of each of the sensing surfaces F included in the image of the current second sensing electrodes Ya to Yd by dividing the first capacitance calculation value of the sensing surface F by the coefficient (the coefficient corrected the coefficient correction unit 142A) that is set in the transverse and right coefficient table 502 and that corresponds to the sensing surface F.

Thereafter, the image correction unit 142B sums, for each of the second sensing electrodes Ya to Yd, the first intermediate calculation value and the second intermediate calculation value of each of the sensing surfaces F. Thus, the image correction unit 142B calculates a corrected first capacitance calculation value of each of the sensing surfaces F included in the image of the second sensing electrodes Ya to Yd.

In addition, the image correction unit 142B calculates, for each of the first sensing electrodes Xa to Xe, a first intermediate calculation value of the capacitance value of each of the sensing surfaces F included in the image of the first sensing electrodes Xa to Xe by dividing the first capacitance calculation value of the sensing surface F by the coefficient (the coefficient corrected by the coefficient correction unit 142A) that is set in the longitudinal and upper coefficient table 503 and that corresponds to the sensing surface F.

Subsequently, the image correction unit 142B calculates, for each of the second sensing electrodes Ya to Yd, a second intermediate calculation value of the capacitance value of each of the sensing surfaces F included in the current image of the first sensing electrodes Xa to Xe by dividing the first capacitance calculation value of the sensing surface F by the coefficient (the coefficient corrected by the coefficient correction unit 142A) that is set in the longitudinal and lower coefficient table 504 and that corresponds to the sensing surface F.

Thereafter, the image correction unit 142B sums, for each of the first sensing electrodes Xa to Xe, the first intermediate calculation value and the second intermediate calculation value of each of the sensing surfaces F. Thus, the image correction unit 142B calculates a corrected first capacitance calculation value of each of the sensing surfaces F included in the image of the first sensing electrodes Xa to Xe.

The normalization unit 142C normalizes the first capacitance calculation value of each of the sensing surfaces F calculated by the first capacitance value calculation unit 142 (the first capacitance calculation value corrected by the image correction unit 142B). According to the capacitance sensor 100 of the present embodiment, since the number of electrodes differs between the first sensing electrodes Xa to Xe and the second sensing electrodes Ya to Yd, the detection amount of the capacitance value differs between the first sensing electrodes Xa to Xe and the second sensing electrodes Ya to Yd. To enable the constraint unit 142D to appropriately perform a subsequent constraint process, the calculation device 140 performs a normalization process by using the normalization unit 142C to eliminate the difference in the detection amount of the capacitance value. For example, the calculation device 140 adjusts the plurality of first capacitance calculation values of each of the first sensing electrodes Xa to Xe or the plurality of first capacitance calculation values of each of the second sensing electrodes Ya to Yd so that the detection amount of the capacitance values (the sum of the first capacitance calculation values of the plurality of sensing surfaces F) of each of the first sensing electrodes Xa to Xe is the same as the detection amount of the capacitance values (the sum of the first capacitance calculation values of the plurality of sensing surfaces F) of each of the second sensing electrodes Ya to Yd.

The constraint unit 142D imposes a constraint on each of the first capacitance calculation values of a plurality of the sensing surfaces F calculated by the first capacitance value calculation unit 142 (the first capacitance calculation values normalized by the normalization unit 142C).

More specifically, the constraint unit 142D constrains, for each of the sensing surfaces F of the first sensing electrodes Xa to Xe, the first capacitance calculation value of the sensing surface F by using the first capacitance calculation values of the other plurality (e.g., four) of sensing surfaces F that surround the sensing surface F (the sensing surfaces F of the second sensing electrodes Ya to Yd).

In addition, the constraint unit 142D constrains, for each of the sensing surfaces F of the second sensing electrodes Ya to Yd, the first capacitance calculation value of the sensing surface F by using the first capacitance calculation values of the other plurality (e.g., four) of sensing surfaces F that surround the sensing surface F (the sensing surfaces F of the first sensing electrodes Xa to Xe).

According to the present embodiment, the following expression (1) is used as an example of a method for constraining the first capacitance calculation value:

$$\text{First capacitance calculation value} = (\text{first capacitance calculation value} \times \beta) + (\text{AVG} \times (1-\beta)) \quad (1),$$

where β is a predetermined constraint coefficient. According to the present embodiment, the value "0.9" is used as a suitable example of the constraint coefficient β. In addition, AVG is the average value of the first capacitance calculation values of the other plurality of sensing surfaces F.

Note that by decreasing the value of the constraint coefficient β more, the computation time can be reduced. However, the quality of the image is degraded more (for example, ghosting occurs). In contrast, by increasing the value of the constraint coefficient β more, the quality of the image can be improved more. For this reason, the constraint factor β may be adjustable in accordance with whether priority is given to the image quality or the computation time.

The second capacitance value calculation unit 143 calculates the second capacitance calculation value at each of the midpoints M between adjacent sensing surfaces F of each of the first sensing electrodes Xa to Xe and the second sensing electrodes Ya to Yd through a predetermined interpolation process based on the first capacitance calculation values of the sensing surfaces F calculated by the first capacitance value calculation unit 142. According to the present embodiment, the bicubic interpolation process is used as a suitable example of the predetermined interpolation process. However, the predetermined process is not limited thereto, and another interpolation process (e.g., the bilinear interpolation process or the like) may be used as the predetermined interpolation process.

The image data calculation unit 144 calculates image data representing the proximity state of the operating body relative to the operating surface 10A of the input device 10 on the basis of the first capacitance calculation values of the plurality of sensing surfaces F calculated by the first capacitance value calculation unit 142 and the second capacitance calculation values at the plurality of midpoints M calculated by the second capacitance value calculation unit 143.

Each of the functions of the calculation device 140 illustrated in FIG. 3 is implemented by, for example, the processor in the calculation device 140 executing a program stored in a memory by using.

Procedure for Processing Performed by Calculation Device 140

FIG. 4 is a flowchart illustrating the procedure for the processing performed by the calculation device 140 according to an embodiment.

The detection value acquisition unit 141 acquires, from the detection circuit 120, the capacitance detection values of each of the first sensing electrodes Xa to Xe and the second sensing electrodes Ya to Yd first (step S401).

Subsequently, the coefficient correction unit 142A corrects the coefficients set in each of the coefficient tables 501 to 504 on the basis of the plurality of capacitance detection values acquired in step S401 (step S402).

Subsequently, the image correction unit 142B calculates the most recent first capacitance calculation value of each of the sensing surfaces F of each of the first sensing electrodes Xa to Xe by correcting the image of the first sensing electrodes Xa to Xe on the basis of the capacitance detection values of the first sensing electrodes Xa to Xe acquired in step S401 and the coefficients set in the longitudinal and upper coefficient table 503 and the longitudinal and lower coefficient table 504 corrected in step S402 (step S403).

In addition, the image correction unit 142B calculates the most recent first capacitance calculation value of each of the sensing surfaces F of each of the second sensing electrodes Ya to Yd by correcting the image of the second sensing electrodes Ya to Yd on the basis of the capacitance detection values of the second sensing electrodes Ya to Yd acquired in step S401 and the coefficients set in the transverse and left coefficient table 501 and the transverse and right coefficient table 502 corrected in step S402 (step S404).

Subsequently, the normalization unit 142C normalizes the first capacitance calculation value of each of the plural sensing surfaces F calculated in steps S403 and S404 (step S405).

Subsequently, the constraint unit 142D imposes a constraint on the first capacitance calculation value of each of the plurality of sensing surfaces F normalized in step S404 (step S406).

Subsequently, the second capacitance value calculation unit 143 calculates the second capacitance calculation value at each of the intersection points M between each of the first sensing electrodes Xa to Xe and each of the second sensing electrodes Ya to Yd through a predetermined interpolation process (according to the present embodiment, the bicubic interpolation process) based on the first capacitance calculation values of the plurality of sensing surfaces F obtained by imposing the constraint in step S406 (step S407).

In addition, the image data calculation unit 144 calculates image data representing the proximity state of the operating body relative to the operating surface 10A of the input device 10 on the basis of the first capacitance calculation value of each of the plurality of sensing surfaces F obtained by imposing the constraint in step S406 and the second capacitance calculation value at each of the plurality of intersection points M calculated in step S407 (step S408).

Subsequently, the calculation device 140 ends the series of processes illustrated in FIG. 4.

Note that the calculation device 140 can gradually lead the first capacitance calculation value of each of the plurality of sensing surfaces F to the optimum solution by repeatedly cycling through steps S402 to S406.

Example of Coefficient Tables 501 to 504

FIGS. 5A to 5D illustrate an example of the coefficient tables 501 to 504 used by the calculation device 140 according to an embodiment.

As illustrated in FIG. 5A, the transverse and left coefficient table 501 has, set therein, coefficients each corresponding to one of the plurality (six in the example illustrated in FIGS. 5A to 5D) of sensing surfaces F of each of the second sensing electrodes Ya to Yd. The transverse and left coefficient table 501 has, set therein, the coefficients each corresponding to the capacitance value of a sensing surface F detected by the detection portion D at the left end of each of the second sensing electrodes Ya to Yd. As illustrated in FIG. 5A, the transverse and left coefficient table 501 indicates, for each of the plurality of sensing surfaces F, the degree of influence on the detection portion D provided at the left end of each of the second sensing electrodes Ya to Yd. For this reason, for each of the second sensing electrodes Ya to Yd, the closer the sensing surface F is to the detection portion D at the left end, a higher coefficient is set for the sensing surface F, because the resistance of the second sensing electrode decreases and, thus, the degree of influence increases.

As illustrated in FIG. 5B, the transverse and right coefficient table 502 has, set therein, coefficients each corresponding to one of a plurality (six in the example illustrated in FIGS. 5A to 5D) of the sensing surfaces F of each of the second sensing electrodes Ya to Yd. The transverse and right coefficient table 502 has, set therein, the coefficients each corresponding to the capacitance value of a sensing surface F detected by the detection portion D at the right end of each of the second sensing electrodes Ya to Yd. As illustrated in FIG. 5B, the transverse and right coefficient table 502 indicates, for each of the plurality of sensing surfaces F, the degree of influence on the detection portion D provided at the right end of each of the second sensing electrodes Ya to Yd. For this reason, for each of the second sensing electrodes Ya to Yd, the closer the sensing surface F is to the detection portion D at the right end, a higher coefficient is set for the sensing surface F, because the resistance of the second sensing electrode decreases and, thus, the degree of influence increases.

As illustrated in FIG. 5C, the longitudinal and upper coefficient table 503 has, set therein, coefficients each corresponding to one of a plurality (five in the example illustrated in FIGS. 5A to 5D) of the sensing surfaces F of each of the first sensing electrodes Xa to Xe. The longitudinal and upper coefficient table 503 has, set therein, the coefficients each corresponding to the capacitance value of a sensing surface F detected by the detection portion D at the upper end of each of the first sensing electrodes Xa to Xe. As illustrated in FIG. 5C, the longitudinal and upper coefficient table 503 indicates, for each of the plurality of sensing surfaces F, the degree of influence on the detection portion D provided at the upper end of each of the first sensing electrodes Xa to Xe. For this reason, for each of the first sensing electrodes Xa to Xe, the closer the sensing surface F is to the detection portion D at the upper end, a higher coefficient is set for the sensing surface F, because the resistance of the first sensing electrode decreases and, thus, the degree of influence increases.

As illustrated in FIG. 5D, the longitudinal and lower coefficient table 504 has, set therein, coefficients each corresponding to one of a plurality (five in the example illustrated in FIGS. 5A to 5D) of the sensing surfaces F of each of the first sensing electrodes Xa to Xe. The longitudinal and lower coefficient table 504 has, set therein, the coefficients each corresponding to the capacitance value of a sensing surface F detected by the detection portion D at the lower end of each of the first sensing electrodes Xa to Xe. As illustrated in FIG. 5D, the longitudinal and lower coefficient table 504 indicates, for each of the plurality of sensing surfaces F, the degree of influence on the detection portion D provided at the lower end of each of the first sensing electrodes Xa to Xe. For this reason, for each of the first sensing electrodes Xa to Xe, the closer the sensing surface F is to the detection portion D at the lower end, a higher coefficient is set for the sensing surface F, because the resistance of the first sensing electrode decreases and, thus, the degree of influence increases.

Note that each of the coefficients in each of the coefficient tables 501 to 504 is obtained by multiplying the resistance ratio of the sensing surface F by the area of the sensing surface F. However, according to the present embodiment, since the areas of the plurality of sensing surfaces F are all the same, each of the coefficients in the transverse and left coefficient table 501 is substantially obtained as the resistance ratio of the sensing surface F.

Example of Processing Performed by Coefficient Correction Unit and Image Correction Unit FIGS. 6A to 6H and FIGS. 7A to 7I illustrate an example of the processing performed by the coefficient correction unit 142A and the image correction unit 142B according to an embodiment.

Referring to FIGS. 6A to 6H, first described are correction of a transverse and left coefficient table 501 performed by the coefficient correction unit 142A and correction of an image performed by the image correction unit 142B on the basis of a corrected transverse and left coefficient table 501'.

FIG. 6A illustrates the transverse and left coefficient table 501 (the coefficients of the sensing surfaces F of the second sensing electrodes Ya to Yd) before correction performed by the coefficient correction unit 142A. FIG. 6B illustrates an image (the capacitance values of the image of the sensing surfaces F of the second sensing electrodes Ya to Yd) before correction performed by the image correction unit 142B.

The coefficient correction unit 142A first calculates, as illustrated in FIG. 6C, a calculation value of each of the sensing surfaces F of the second sensing electrodes Ya to Yd by multiplying the capacitance value of the image of the sensing surface F illustrated in FIG. 6B by the coefficient of the sensing surface F illustrated in FIG. 6A.

Subsequently, as illustrated in FIG. 6D, for each of the second sensing electrodes Ya to Yd, the coefficient correction unit 142A calculates, as a prediction value of the capacitance value detected by the detection portion D at the left end of the second sensing electrode, the sum of the calculation values of the plurality of sensing surfaces F illustrated in FIG. 6C.

Subsequently, as illustrated in FIG. 6F, for each of the second sensing electrodes Ya to Yd, the coefficient correction unit 142A calculates a correction value by dividing the prediction value illustrated in FIG. 6D by an actual measurement value illustrated in FIG. 6E (the capacitance value actually detected by the detection portion D at the left end).

Then, the coefficient correction unit 142A corrects the transverse and left coefficient table 501 illustrated in FIG. 6A by using the correction values illustrated in FIG. 6F. More specifically, for each of the second sensing electrodes Ya to Yd, the coefficient correction unit 142A calculates a corrected coefficient of each of the plurality of sensing surfaces F by dividing the correction value illustrated in FIG. 6F by the uncorrected coefficient of the sensing surface F illustrated in FIG. 6A. In this manner, the coefficient correction unit 142A derives the corrected transverse and left coefficient table 501' illustrated in FIG. 6G.

Subsequently, the image correction unit 142B corrects the capacitance value of the image of each of the sensing surfaces F of the second sensing electrodes Ya to Yd illustrated in FIG. 6B on the basis of the corrected transverse and left coefficient table 501' illustrated in FIG. 6G. More specifically, for each of the sensing surfaces F of the second sensing electrodes Ya to Yd, the image correction unit 142B divides the uncorrected capacitance value of the image illustrated in FIG. 6B by the corrected coefficient illustrated in FIG. 6G to calculate the corrected capacitance value of the image (a first intermediate calculation value) illustrated in FIG. 6H.

Referring to FIGS. 7A to 7I, described below are correction of the transverse and right coefficient table 502 by the coefficient correction unit 142A and correction of an image by the image correction unit 142B based on the corrected transverse and right coefficient table 502'.

FIG. 7A illustrates the transverse and right coefficient table 502 (the coefficients of the sensing surfaces F of the second sensing electrodes Ya to Yd) before correction performed by the coefficient correction unit 142A. FIG. 7B illustrates an image (the capacitance values of the image of the sensing surfaces F of the second sensing electrodes Ya to Yd) before correction performed by the image correction unit 142B.

The coefficient correction unit 142A first calculates, as illustrated in FIG. 7C, a calculation value of each of the sensing surfaces F of the second sensing electrodes Ya to Yd by multiplying the capacitance value of the image of the sensing surface F illustrated in FIG. 7B by the coefficient of the sensing surface F illustrated in FIG. 7A.

Subsequently, as illustrated in FIG. 7D, for each of the second sensing electrodes Ya to Yd, the coefficient correction unit 142A calculates, as a prediction value of the capacitance value detected by the detection portion D at the right end of the second sensing electrode, the sum of the calculation values of the plurality of sensing surfaces F illustrated in FIG. 7C.

Subsequently, as illustrated in FIG. 7F, for each of the second sensing electrodes Ya to Yd, the coefficient correction unit 142A calculates a correction value by dividing the prediction value illustrated in FIG. 7D by an actual measurement value illustrated in FIG. 7E (the capacitance value actually detected by the detection portion D at the right end).

Then, the coefficient correction unit 142A corrects the transverse and right coefficient table 502 illustrated in FIG. 7A by using the correction values illustrated in FIG. 7F. More specifically, for each of the second sensing electrodes Ya to Yd, the coefficient correction unit 142A calculates a corrected coefficient of each of the plurality of sensing surfaces F by dividing the correction value illustrated in FIG. 7F by the uncorrected coefficient of the sensing surface F illustrated in FIG. 7A. In this manner, the coefficient correction unit 142A derives the corrected transverse and right coefficient table 502' illustrated in FIG. 7G.

Subsequently, the image correction unit 142B corrects the capacitance value of the image of each of the sensing surfaces F of the second sensing electrodes Ya to Yd illustrated in FIG. 7B on the basis of the corrected transverse and right coefficient table 502' illustrated in FIG. 7G. More specifically, for each of the sensing surfaces F of the second sensing electrodes Ya to Yd, the image correction unit 142B divides the uncorrected capacitance value of the image illustrated in FIG. 7B by the corrected coefficient illustrated in FIG. 7G to calculate the corrected capacitance value of the image (a second intermediate calculation value) illustrated in FIG. 7H.

Finally, for each of the sensing surfaces F of the second sensing electrodes Ya to Yd, the image correction unit 142B sums the corrected capacitance value of the image illustrated in FIG. 6H (the first intermediate calculation value) and the corrected capacitance value of the image illustrated in FIG. 7H (the second intermediate calculation value) to calculate the most recent updated value of the capacitance value of the image, as illustrated in FIG. 7I.

Note that the coefficient correction unit 142A corrects the coefficient tables 503 and 504 in the same way as in the method for correcting the coefficient tables 501 and 502 described above.

In addition, the image correction unit 142B corrects the image of the first sensing electrodes Xa to Xe based on the coefficient tables 503 and 504 in the same way as in the method for correcting the image of the second sensing electrodes Ya to Yd based on the coefficient tables 501 and 502 described above.

Example of Processing Performed by Constraint Unit 142D

Figure 8:
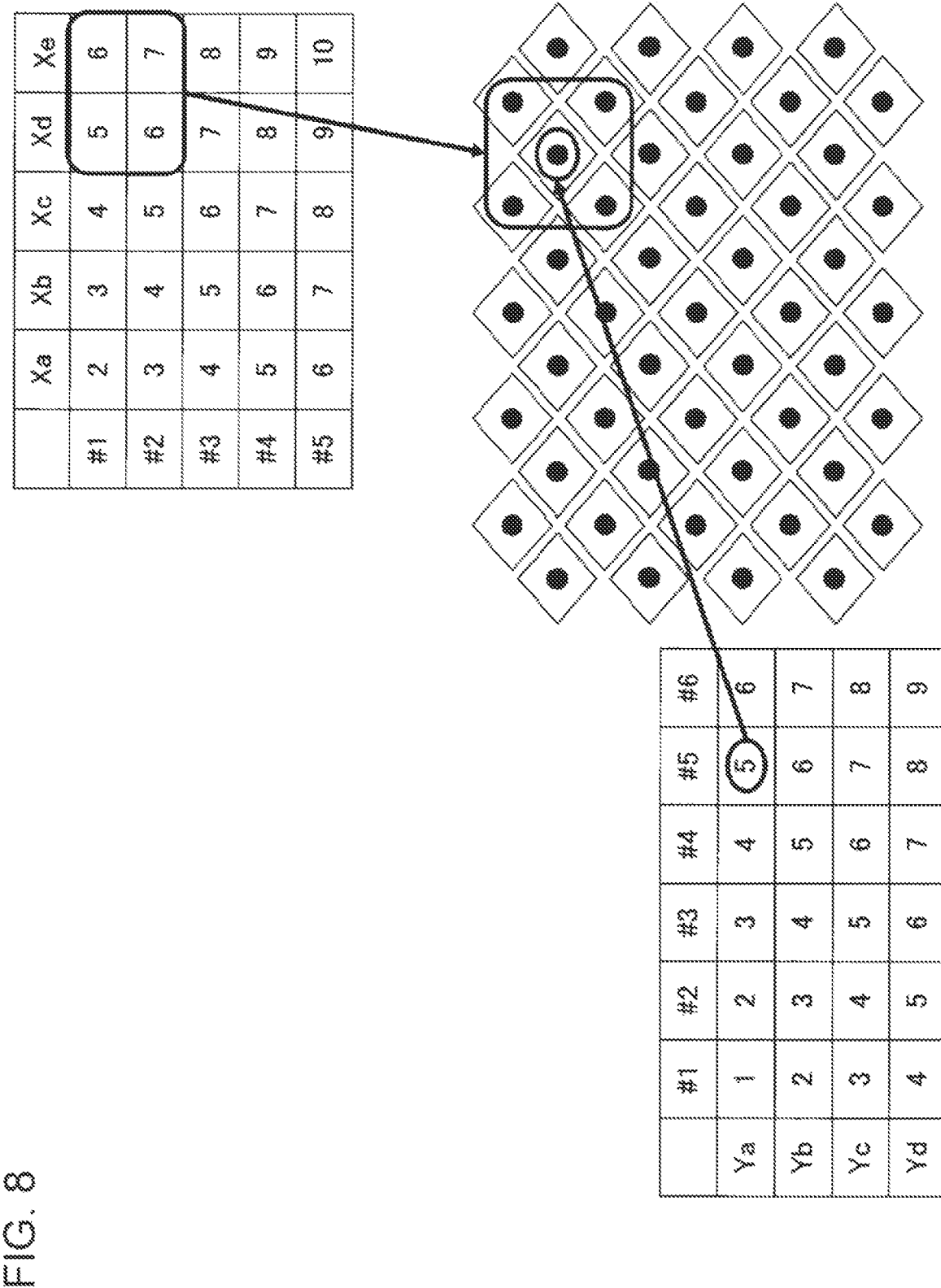
FIG. 8 illustrates an example of the processing performed by a constraint unit according to an embodiment.

FIG. 8 illustrates an example of the processing performed by the constraint unit 142D according to an embodiment. In the example illustrated in FIG. 8, the first capacitance calculation value of the fifth sensing surface F from the left of the second sensing electrode Ya (hereinafter referred to as a "sensing surface Fya5") is constrained.

As illustrated in FIG. 8, the sensing surface Fya5 is surrounded by the first sensing electrode of the first sensing electrode Xd from the top (hereinafter referred to as "sensing surface Fxd1"), the second sensing electrode of the first sensing electrode Xd from the top (hereinafter referred to as a "sensing surface Fxd2"), the first sensing electrode of the first sensing electrode Xe from the top (hereinafter referred to as a "sensing surface Fxe1"), and the second sensing electrode of the first sensing electrode Xe from the top (hereinafter referred to as a "sensing surface Fxe2").

The constraint unit 142D constrains the first capacitance calculation value "5" of the sensing surface Fya5 by the first capacitance calculation values "5", "6", "6", and "7" of the four sensing surfaces Fxd1, Fxd2, Fxe1, Fxe2, respectively.

For example, based on the above-described expression (1), the constraint unit 142D calculates a constrained first capacitance calculation value of the sensing surface Fya5, as follows:

Constrained first capacitance calculation value=$(5 \times 0.9) + (6 \times (1-0.9)) = 5.1$.

Similarly, for each of the other sensing surfaces F of the first sensing electrodes Xa to Xe, the constraint unit 142D constrains the first capacitance calculation value of the sensing surface F by using the first capacitance calculation values of the other sensing surfaces F (the sensing surfaces F of the second sensing electrodes Ya to Yd) that surround the sensing surface F.

In addition, for each of the sensing surfaces F of the second sensing electrodes Ya to Yd, the constraint unit 142D constrains the first capacitance calculation value of the sensing surface F by using the first capacitance calculation values of the other sensing surfaces F (the sensing surfaces F of the first sensing electrodes Xa to Xe) that surround the sensing surface F.

In this manner, the constraint unit 142D can constrain the first sensing electrodes Xa to Xe by the second sensing electrodes Ya to Yd and the second sensing electrodes Ya to Yd by the first sensing electrodes Xa to Xe. Thus, the constraint unit 142D can lead the first capacitance calculation value of each of the sensing surfaces F of each of the first sensing electrodes Xa to Xe and the second sensing electrodes Ya to Yd to the optimum solution.

EXAMPLES

FIGS. 9A and 9B and FIGS. 10A and 10B illustrate examples of the calculation device 140 according to the present embodiment. In this example, it was examined what type of image data was able to be obtained for each of an existing calculation device and the calculation device 140 according to the present embodiment. Note that in this example, an existing calculation device was one that uses each of the intersection points between the first and second sensing electrodes as a detection point and calculates image data on the basis of the capacitance value at each of the detection points.

Figure 9A:
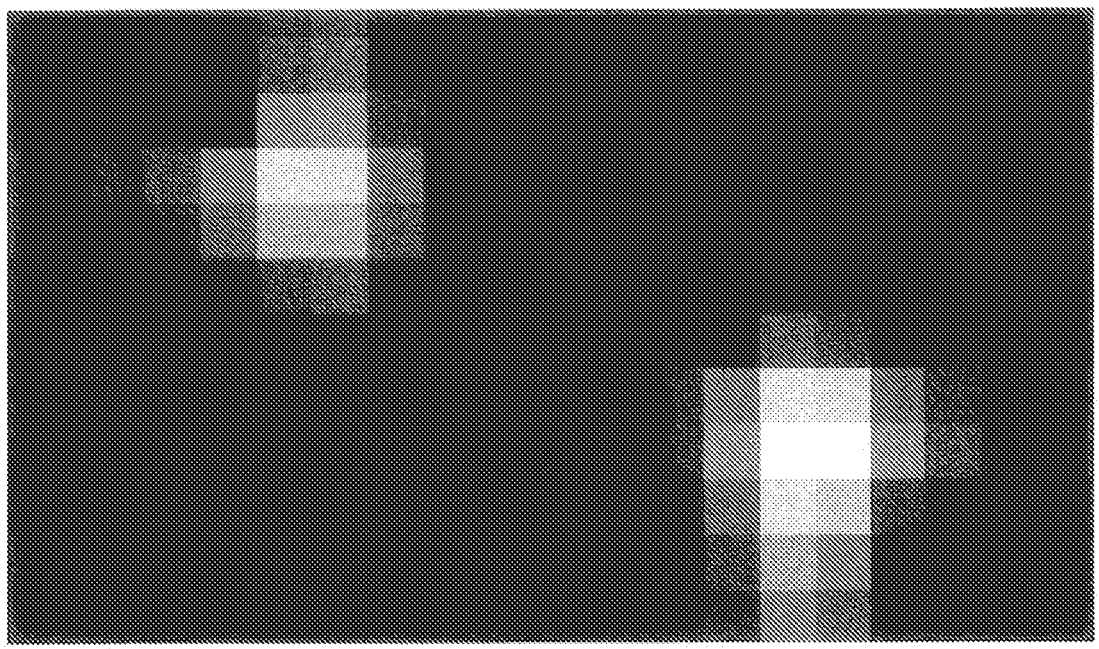
FIGS. 9A and 9B illustrate an example of a calculation device according to an embodiment.
Figure 9B:
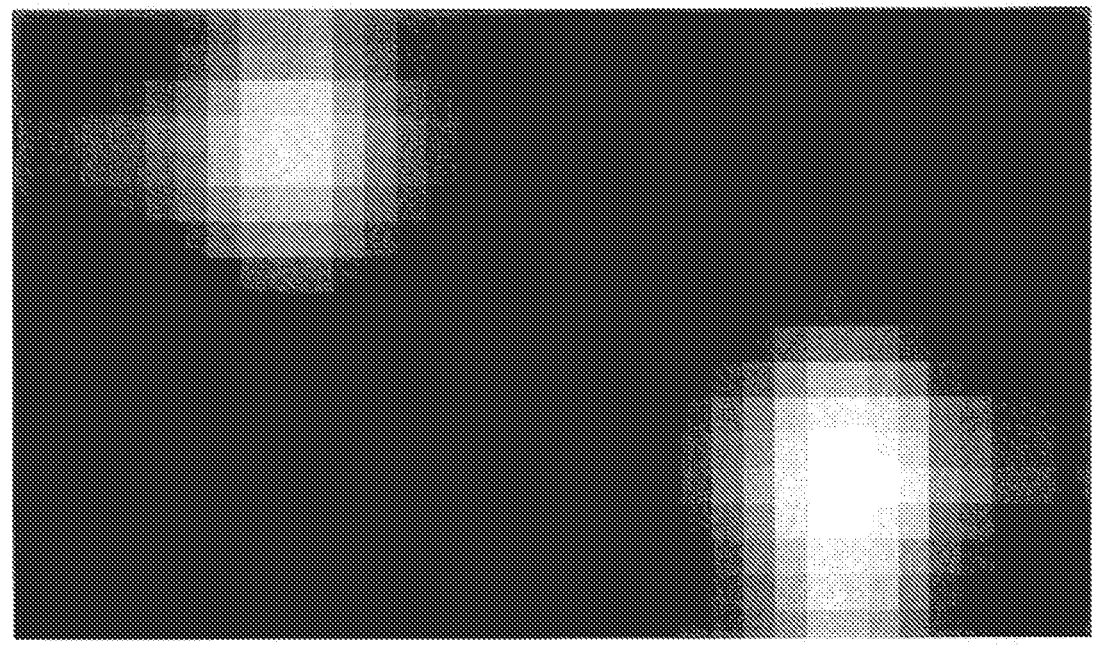

FIG. 9A illustrates an example of the image data calculated by an existing calculation device when two operating bodies are brought into contact with the operating surface of an input device. FIG. 9B illustrates an example of the image data calculated by the calculation device 140 according to the present embodiment when two operating bodies are brought into contact with the operating surface of the input device 10.

Figure 10A:
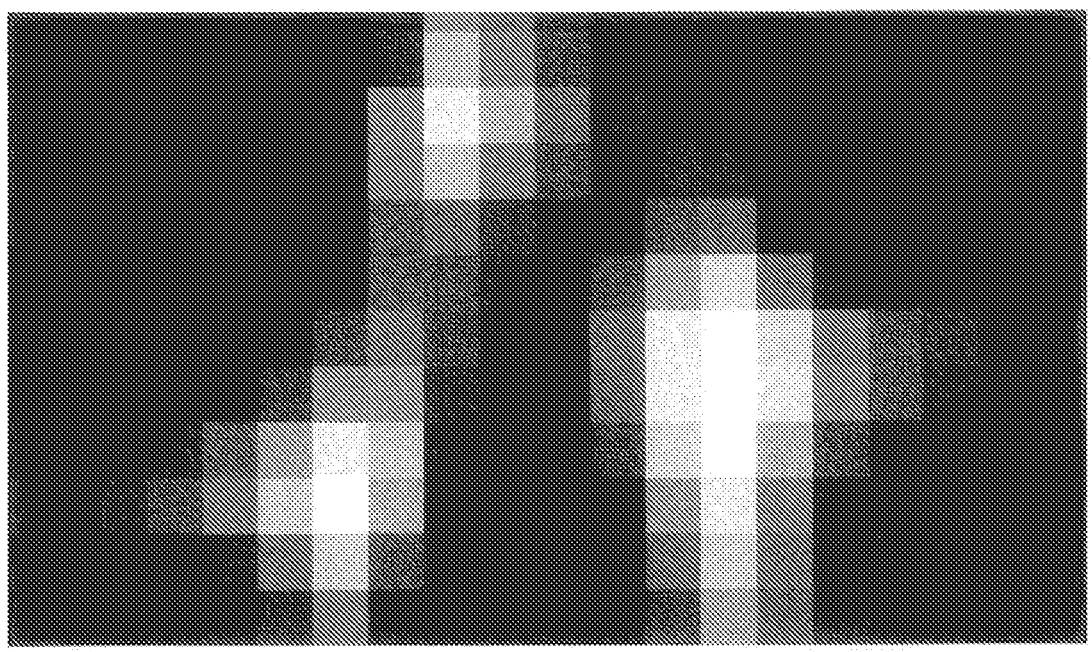
FIGS. 10A and 10B illustrate an example of a calculation device according to an embodiment.
Figure 10B:
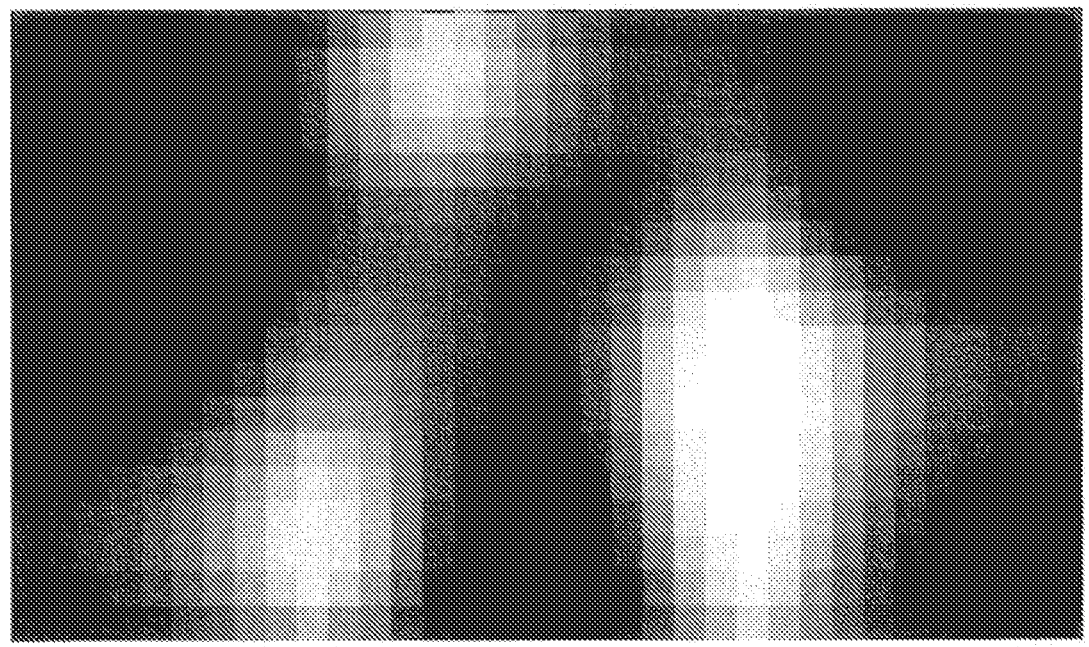

FIG. 10A illustrates an example of the image data calculated by an existing calculation device when three operating bodies are brought into contact with the operating surface of an input device. FIG. 10B illustrates an example of the image data calculated by the calculation device 140 according to the present embodiment when three operating bodies are brought into contact with the operating surface of the input device 10.

As can be seen from the examples illustrated in FIGS. 9A and 9B and FIGS. 10A and 10B, the calculation device 140 according to the present embodiment was able to obtain image data with a higher resolution than the existing calculation device. This is because the existing calculation device generates the image data on the basis of the capacitance values at 20 detection points, which are the intersection points between the first sensing electrodes Xa to Xe and the second sensing electrodes Ya to Yd, while the calculation device 140 according to the present embodiment generates the image data on the basis of the capacitance values at 69 detection points in total, that is, the first capacitance calculation values at the detection points in 25 sensing surfaces F of the first sensing electrodes Xa to Xe, the first capacitance calculation values at the detection points in 24 sensing surfaces F of the second sensing electrodes Ya to Yd, and the second capacitance calculation values at 20 intersection points M between the first sensing electrodes Xa to Xe and the second sensing electrodes Ya to Yd.

As described above, the calculation device 140 according to the present embodiment calculates image data representing proximity of an operating body to the operating surface 10A on the basis of capacitance detection values detected by the capacitance sensor 100. The capacitance sensor 100 includes first sensing electrodes Xa to Xe and second sensing electrodes Ya to Yd disposed perpendicularly to each other, and each of the first sensing electrodes Xa to Xe and the second sensing electrodes Ya to Yd has a plurality of sensing surfaces F. The capacitance detection values are output from the plurality of first sensing electrodes Xa to Xe and the plurality of the second sensing electrodes Ya to Yd. The calculation device 140 includes a detection value acquisition unit 141 configured to acquire the capacitance detection values output from the first sensing electrodes Xa to Xe and the second sensing electrodes Ya to Yd, a first capacitance value calculation unit 142 configured to calculate, on the basis of the capacitance detection values acquired by the detection value acquisition unit 141 and coefficients each preset for one of the first sensing electrodes Xa to Xe and the second sensing electrodes Ya to Yd, the first capacitance calculation values each for one of sensing surfaces F of the first sensing electrodes Xa to Xe and the second sensing electrodes Ya to Yd, and an image data calculation unit 144 configured to calculate the image data on the basis of the plurality of the first capacitance calculation values calculated by the first capacitance value calculation unit 142.

Thus, the calculation device 140 according to the present embodiment can obtain, as the detection positions of capacitance values, the sensing surfaces F of each of the first sensing electrodes Xa to Xe and the second sensing electrodes Ya to Yd and, thus, the difference between the proximity position obtained by calculation and the actual proximity position can be reduced. As a result, according to the calculation device 140 of the present embodiment, in the capacitance sensor 100 in which each of the sensing electrodes has a plurality of sensing surfaces, it is possible to reduce a decrease in the detection accuracy of the proximity position.

In addition, in the calculation device 140 according to the present embodiment, the total number of the coefficients preset for the first sensing electrodes Xa to Xe may differ from the total number of the coefficients preset for the second sensing electrode Ya to Yd in accordance with a difference between the total number of the sensing surfaces F of the first sensing electrodes Xa to Xe and the total number of the sensing surfaces F of the second sensing electrodes Ya to Yd.

In this way, the calculation device 140 according to the present embodiment can individually set the coefficients for the sensing surfaces F even for the capacitance sensor 100 having the total number of the sensing surfaces F of the first sensing electrodes Xa to Xe and the total number of the sensing surfaces F of the second sensing electrodes Ya to Yd that differs from each other. As a result, the detection accuracy of the proximity can be increased.

In addition, in the calculation device 140 according to the present embodiment, the first capacitance value calculation unit 142 may calculate the first capacitance calculation value for each of the sensing surfaces F of each of the first sensing electrodes Xa to Xe on the basis of a capacitance value (a first capacitance detection value) detected by the detection portion D (the first detection portion) at the upper end of the first sensing electrode, a coefficient for the sensing surface F corresponding to the first capacitance detection value, a capacitance value (a second capacitance detection value) detected by the detection portion D (the second detection portion) at the lower end of the first sensing electrode, and a coefficient of the sensing surface F corresponding to the second capacitance detection value, and the first capacitance value calculation unit may calculate the first capacitance calculation value for each of the sensing surfaces F of each of the second sensing electrodes Ya to Yd on the basis of a capacitance value (a third capacitance detection value) detected by the detection portion D (a third detection portion) at the left end of the second sensing electrode, a coefficient for the sensing surface F corresponding to the third capacitance detection value, a capacitance value (a fourth capacitance detection value) detected by a detection portion D (a fourth detection portion) at right end of the second sensing electrode, and a coefficient for the sensing surface F corresponding to the fourth capacitance detection value.

In this way, the calculation device 140 according to the present embodiment can increase the calculation accuracy of the first capacitance calculation value of each of the sensing surfaces F of each of the first sensing electrodes Xa to Xe and the second sensing electrodes Ya to Yd.

In addition, the calculation device 140 according to the present embodiment further may include a second capacitance value calculation unit 143 configured to calculate a second capacitance calculation value at each of intersection points M of the plurality of the first sensing electrodes Xa to Xe with the plurality of second sensing electrodes Ya to Yd through a predetermined interpolation process based on the plurality of first capacitance calculation values calculated by the first capacitance value calculation unit 142. The image data calculation unit 144 may calculate the image data on the basis of the first capacitance calculation values calculated by the first capacitance value calculation unit 142 and the second capacitance calculation values calculated by the second capacitance value calculation unit 143.

In this way, the calculation device 140 according to the present embodiment can calculate the image data on the basis of the capacitance values calculated for a larger number of detection points and, thus, can increase the resolution of the calculated image data more.

In particular, in the calculation device 140 according to the present embodiment, the second capacitance value calculation unit 143 may calculate the second capacitance calculation values through a bicubic interpolation process based on the first capacitance calculation values calculated by the first capacitance value calculation unit 142.

In this way, the calculation device 140 according to the present embodiment can increase the calculation accuracy of each of the plurality of second capacitance calculation values more.

In addition, the calculation device 140 according to the present embodiment may further include the constraint unit 142D configured to constrain the first capacitance calculation value of a sensing surface F of one of a set of the first sensing electrodes Xa to Xe and a set of the second sensing electrodes Ya to Yd by using the first capacitance calculation values of the sensing surfaces F of the other set that surround the sensing surface.

In this way, the calculation device 140 according to the present embodiment can achieve a mutually complementary relationship between the set of the first sensing electrodes Xa to Xe and the set of the second sensing electrodes Ya to Yd in calculation of the first capacitance calculation value. As a result, the calculation device 140 according to the present embodiment can increase the accuracy of calculation of the first capacitance calculation value of each of the sensing surfaces F of each of the first sensing electrodes Xa to Xe and the second sensing electrodes Ya to Yd more.

In particular, in the calculation device 140 according to the present embodiment, the constraint unit 142D may calculate the constrained first capacitance calculation value by multiplying the unconstrained first capacitance calculation value by a predetermined constraint coefficient $\beta$.

In this way, the calculation device 140 according to the present embodiment can gradually change the first electrostatic capacitance calculation value and, thus, can gradually lead the first electrostatic capacitance calculation value to the optimum solution.

In addition, the calculation device 140 according to the present embodiment may further include a normalization unit configured to perform a normalization process such that the sum of the first capacitance calculation values of one of a set of the first sensing electrodes Xa to Xe and a set of the second sensing electrodes Ya to Yd is the same as the sum of the first capacitance calculation values of the other set.

In this manner, the calculation device 140 according to the present embodiment can achieve a mutually complementary relationship between the set of the first sensing electrodes Xa to Xe and the set of the second sensing electrodes Ya to Yd in calculation of the first capacitance calculation value. As a result, the calculation device 140 according to the present embodiment can increase the accuracy of calculation of the first capacitance calculation value of each of the sensing surfaces F of each of the first sensing electrodes Xa to Xe and the second sensing electrodes Ya to Yd more.

In addition, the input device 10 according to the present embodiment includes the capacitance sensor 100 and the calculation device 140.

Thus, the input device 10 according to the present embodiment can obtain, as the detection positions of capacitance values, the sensing surfaces F of each of the first sensing electrodes Xa to Xe and the second sensing electrodes Ya to Yd of the capacitance sensor 100 by using the calculation device 140 and, thus, the difference between the proximity position obtained by calculation and the actual proximity position can be reduced. As a result, according to the input device 10 of the present embodiment, in the capacitance sensor 100 in which each of the sensing electrodes has a plurality of sensing surfaces, it is possible to reduce a decrease in the detection accuracy of the proximity position.

In addition, according to the present embodiment, a calculation method is provided for calculating image data representing proximity of an operating body to an operating surface 10A on the basis of capacitance detection values detected by a capacitance sensor 100. The capacitance sensor 100 includes a plurality of first sensing electrodes Xa to Xe and a plurality of the second sensing electrodes Ya to Yd disposed perpendicularly to each other. Each of the first sensing electrodes Xa to Xe and the second sensing electrodes Ya to Yd has a plurality of sensing surfaces F. The capacitance detection values are output from the plurality of first sensing electrodes Xa to Xe and the plurality of the second sensing electrodes Ya to Yd. The calculation method includes the detection value acquisition step of acquiring the capacitance detection values output from the first sensing electrodes Xa to Xe and the second sensing electrodes Ya to Yd, the first capacitance value calculation step of calculating, on the basis of the capacitance detection values acquired in the detection value acquisition step and coefficients each preset for one of the first sensing electrodes Xa to Xe and the second sensing electrodes Ya to Yd, the first capacitance calculation values each for one of sensing surfaces F of the first sensing electrodes Xa to Xe and the second sensing electrodes Ya to Yd, and the image data calculation step of calculating the image data on the basis of the plurality of the first capacitance calculation values calculated in the first capacitance value calculation step.

In this way, the calculation method according to the present embodiment can obtain, as the detection positions of capacitance values, the sensing surfaces F of each of the first sensing electrodes Xa to Xe and the second sensing electrodes Ya to Yd and, thus, the difference between the proximity position obtained by calculation and the actual proximity position can be reduced. As a result, according to the calculation method of the present embodiment, in the capacitance sensor 100 in which each of the sensing electrodes has a plurality of sensing surfaces, it is possible to reduce a decrease in the detection accuracy of the proximity position.

In addition, according to the present embodiment, a program is provided for calculating image data representing proximity of an operating body to an operating surface 10A on the basis of capacitance detection values detected by a capacitance sensor 100. The capacitance sensor includes a plurality of first sensing electrodes Xa to Xe and a plurality of the second sensing electrodes Ya to Yd disposed perpendicularly to each other. Each of the first sensing electrodes Xa to Xe and the second sensing electrodes Ya to Yd has a plurality of sensing surfaces F. The capacitance detection values are output from the plurality of first sensing electrodes Xa to Xe and the plurality of the second sensing electrodes Ya to Yd. The program includes program code for causing a computer to function as the detection value acquisition unit 141 configured to acquire the capacitance detection values output from the first sensing electrodes Xa to Xe and the second sensing electrodes Ya to Yd, the first capacitance value calculation unit 142 configured to calculate, on the basis of the capacitance detection values acquired by the detection value acquisition unit 141 and coefficients each preset for one of the first sensing electrodes Xa to Xe and the second sensing electrodes Ya to Yd, the first capacitance calculation values each for one of sensing surfaces F of the first sensing electrodes Xa to Xe and the second sensing electrodes Ya to Yd, and the image data calculation unit 144 configured to calculate the image data on the basis of the plurality of the first capacitance calculation values calculated by the first capacitance value calculation unit 142.

In this manner, the program according to the present embodiment can obtain, as the detection positions of capacitance values, the sensing surfaces F of each of the first sensing electrodes Xa to Xe and the second sensing electrodes Ya to Yd and, thus, the difference between the proximity position obtained by calculation and the actual proximity position can be reduced. As a result, according to the program of the present embodiment, in the capacitance sensor 100 in which each of the sensing electrodes has a plurality of sensing surfaces, it is possible to reduce a decrease in the detection accuracy of the proximity position.

While one embodiment of the present invention has been described in detail above, the present invention is not limited to the embodiments, and various modifications and changes can be made without departing from the spirit and scope of the present invention as defined by the appended claims.

What is claimed is:

1. A calculation device for calculating image data representing proximity of an operating body to an operating surface on a basis of capacitance detection values detected by a capacitance sensor, the capacitance sensor including a plurality of first sensing electrodes and a plurality of the second sensing electrodes disposed perpendicularly to each other, each of the first sensing electrodes and the second sensing electrodes having a plurality of sensing surfaces, the capacitance detection values being output from the plurality of first sensing electrodes and the plurality of the second sensing electrodes, the calculation device comprising:
a detection value acquisition unit configured to acquire the capacitance detection values output from the first sensing electrodes and the second sensing electrodes;
a first capacitance value calculation unit configured to calculate, on a basis of the capacitance detection values acquired by the detection value acquisition unit and coefficients each preset for one of the first sensing electrodes and the second sensing electrodes, the first capacitance calculation values each for one of sensing surfaces of the first sensing electrodes and the second sensing electrodes; and
an image data calculation unit configured to calculate the image data on a basis of the plurality of the first capacitance calculation values calculated by the first capacitance value calculation unit,
wherein a total number of the coefficients preset for the first sensing electrodes differs from a total number of the coefficients preset for the second sensing electrodes in accordance with a difference between a total number of the sensing surfaces of the first sensing electrodes and a total number of the sensing surfaces of the second sensing electrodes.

2. The calculation device according to claim 1, wherein the first capacitance value calculation unit calculates the first capacitance calculation value for each of the sensing surfaces of each of the first sensing electrodes on a basis of a first capacitance detection value detected by a first detection portion at one end of the first sensing electrodes, a coefficient for the sensing surface corresponding to the first capacitance detection value, a second capacitance detection value detected by a second detection portion at the other end of the first sensing electrodes, and a coefficient for the sensing surface corresponding to the second capacitance detection value, and
wherein the first capacitance value calculation unit calculates the first capacitance calculation value for each of the sensing surfaces of each of the second sensing electrodes on a basis of a third capacitance detection value detected by a third detection portion at one end of the second sensing electrodes, a coefficient for the sensing surface corresponding to the third capacitance detection value, a fourth capacitance detection value detected by a fourth detection portion at the other end of the second sensing electrodes, and a coefficient for the sensing surface corresponding to the fourth capacitance detection value.

3. The calculation device according to claim 2, further comprising:
a second capacitance value calculation unit configured to calculate a second capacitance calculation value at each of intersection points of the plurality of first sensing electrodes with the plurality of second sensing electrodes through a predetermined interpolation process based on the plurality of first capacitance calculation values calculated by the first capacitance value calculation unit,
wherein the image data calculation unit calculates the image data on a basis of the first capacitance calculation values calculated by the first capacitance value calculation unit and the second capacitance calculation values calculated by the second capacitance value calculation unit.

4. The calculation device according to claim 3, wherein the second capacitance value calculation unit calculates the second capacitance calculation values through a bicubic interpolation process based on the first capacitance calculation values calculated by the first capacitance value calculation unit.

5. The calculation device according to claim 4, further comprising:
a constraint unit configured to constrain the first capacitance calculation value of a sensing surface of one of a set of the first sensing electrodes and a set of the second sensing electrodes by using the first capacitance calculation values of the sensing surfaces of the other set that surround the sensing surface.

6. The calculation device according to claim 5, wherein the constraint unit calculates the constrained first capacitance calculation value by multiplying the unconstrained first capacitance calculation value by a predetermined constraint coefficient.

7. The calculation device according to claim 6, further comprising:
a normalization unit configured to perform a normalization process such that a sum of the first capacitance calculation values of one of a set of the first sensing electrodes and a set of the second sensing electrodes is the same as a sum of the first capacitance calculation values of the other set.

8. An input device comprising:
the capacitance sensor; and
the calculation device according to claim 7.

9. The calculation device according to claim 1, wherein the first capacitance value calculation unit calculates the first capacitance calculation value for each of the sensing surfaces of each of the first sensing electrodes on a basis of a first capacitance detection value detected by a first detection portion at one end of the first sensing electrodes, a coefficient for the sensing surface corresponding to the first capacitance detection value, a second capacitance detection value detected by a second detection portion at the other end of the first sensing electrodes, and a coefficient for the sensing surface corresponding to the second capacitance detection value, and wherein the first capacitance value calculation unit calculates the first capacitance calculation value for each of the sensing surfaces of each of the second sensing electrodes on a basis of a third capacitance detection value detected by a third detection portion at one end of the second sensing electrodes, a coefficient for the sensing surface corresponding to the third capacitance detection value, a fourth capacitance detection value detected by a fourth detection portion at the other end of the second sensing electrodes, and a coefficient for the sensing surface corresponding to the fourth capacitance detection value.

10. The calculation device according to claim 9, further comprising:

a second capacitance value calculation unit configured to calculate a second capacitance calculation value at each of intersection points of the plurality of first sensing electrodes with the plurality of second sensing electrodes through a predetermined interpolation process based on the plurality of first capacitance calculation values calculated by the first capacitance value calculation unit, wherein the image data calculation unit calculates the image data on a basis of the first capacitance calculation values calculated by the first capacitance value calculation unit and the second capacitance calculation values calculated by the second capacitance value calculation unit.

11. The calculation device according to claim 10, wherein the second capacitance value calculation unit calculates the second capacitance calculation values through a bicubic interpolation process based on the first capacitance calculation values calculated by the first capacitance value calculation unit.

12. The calculation device according to claim 11, further comprising:

a constraint unit configured to constrain the first capacitance calculation value of a sensing surface of one of a set of the first sensing electrodes and a set of the second sensing electrodes by using the first capacitance calculation values of the sensing surfaces of the other set that surround the sensing surface.

13. The calculation device according to claim 12, wherein the constraint unit calculates the constrained first capacitance calculation value by multiplying the unconstrained first capacitance calculation value by a predetermined constraint coefficient.

14. The calculation device according to claim 13, further comprising:

a normalization unit configured to perform a normalization process such that a sum of the first capacitance calculation values of one of a set of the first sensing electrodes and a set of the second sensing electrodes is the same as a sum of the first capacitance calculation values of the other set.

15. An input device comprising:

the capacitance sensor; and the calculation device according to claim 14.

16. A calculation method for calculating image data representing proximity of an operating body to an operating surface on a basis of capacitance detection values detected by a capacitance sensor, the capacitance sensor including a plurality of first sensing electrodes and a plurality of the second sensing electrodes disposed perpendicularly to each other, each of the first sensing electrodes and the second sensing electrodes having a plurality of sensing surfaces, the capacitance detection values being output from the plurality of first sensing electrodes and the plurality of the second sensing electrodes, the calculation method comprising:

a detection value acquisition step of acquiring the capacitance detection values output from the first sensing electrodes and the second sensing electrodes;

a first capacitance value calculation step of calculating, on a basis of the capacitance detection values acquired in the detection value acquisition step and coefficients each preset for one of the first sensing electrodes and the second sensing electrodes, the first capacitance calculation values each for one of sensing surfaces of the first sensing electrodes and the second sensing electrodes; and an image data calculation step of calculating the image data on a basis of the plurality of the first capacitance calculation values calculated in the first capacitance value calculation step, wherein a total number of the coefficients preset for the first sensing electrodes differs from a total number of the coefficients preset for the second sensing electrodes in accordance with a difference between a total number of the sensing surfaces of the first sensing electrodes and a total number of the sensing surfaces of the second sensing electrodes.

17. A non-transitory computer readable medium comprising instructions for calculating image data representing proximity of an operating body to an operating surface on a basis of capacitance detection values detected by a capacitance sensor, the capacitance sensor including a plurality of first sensing electrodes and a plurality of the second sensing electrodes disposed perpendicularly to each other, each of the first sensing electrodes and the second sensing electrodes having a plurality of sensing surfaces, the capacitance detection values being output from the plurality of first sensing electrodes and the plurality of the second sensing electrodes, the program comprising:

program code for causing a computer to function as a detection value acquisition unit configured to acquire the capacitance detection values output from the first sensing electrodes and the second sensing electrodes;

a first capacitance value calculation unit configured to calculate, on a basis of the capacitance detection values acquired by the detection value acquisition unit and coefficients each preset for one of the first sensing electrodes and the second sensing electrodes, the first capacitance calculation values each for one of sensing surfaces of the first sensing electrodes and the second sensing electrodes; and an image data calculation unit configured to calculate the image data on a basis of the plurality of the first capacitance calculation values calculated by the first capacitance value calculation unit, wherein a total number of the coefficients preset for the first sensing electrodes differs from a total number of the coefficients preset for the second sensing electrodes in accordance with a difference between a total number of the sensing surfaces of the first sensing electrodes and a total number of the sensing surfaces of the second sensing electrodes.

* * * * *